BOBBIN STORAGE AND DELIVERY INSTALLATION

Filed Sept. 12, 1967 7 Sheets-Sheet 1

INVENTORS
CHARLES W. BROUWER
HENRY C. BUCHEISTER
RAYMOND V. TATA
BY Albert P. Davis
Burnett W. Norton
ATTORNEYS

BOBBIN STORAGE AND DELIVERY INSTALLATION

Filed Sept. 12, 1967

INVENTORS
CHARLES W. BROUWER
HENRY C. BUCHEISTER
RAYMOND V. TATA
BY Albert P. Davis
Burnett W. Norton
ATTORNEYS

BOBBIN STORAGE AND DELIVERY INSTALLATION

Filed Sept. 12, 1967 7 Sheets-Sheet 3

INVENTORS
CHARLES W. BROUWER
HENRY C. BUCHEISTER
RAYMOND V. TATA
BY Albert P. Davis
Burnett W. Norton
ATTORNEYS

BOBBIN STORAGE AND DELIVERY INSTALLATION

Filed Sept. 12, 1967 7 Sheets-Sheet 4

INVENTORS
CHARLES W. BROUWER
HENRY C. BUCHEISTER
RAYMOND V. TATA
BY Elliott P. Davis
Burnett W. Norton
ATTORNEYS April 14, 1970 C. W. BROUWER ET AL 3,506,106

BOBBIN STORAGE AND DELIVERY INSTALLATION

Filed Sept. 12, 1967 7 Sheets-Sheet 5

INVENTORS
CHARLES W. BROUWER
HENRY C. BUCHEISTER
RAYMOND V. TATA

BY Albert P. Davis
Burnett W. Norton
ATTORNEYS

BOBBIN STORAGE AND DELIVERY INSTALLATION

Filed Sept. 12, 1967 7 Sheets-Sheet 6

INVENTORS
CHARLES W. BROUWER
HENRY C. BUCHEISTER
RAYMOND V. TATA

BY Albert P. Davis
Burnett W. Norton
ATTORNEYS

BOBBIN STORAGE AND DELIVERY INSTALLATION

Filed Sept. 12, 1967 7 Sheets-Sheet 7

INVENTORS
CHARLES W. BROUWER
HENRY C. BUCHEISTER
RAYMOND V. TATA
BY Albert P. Davis
Burnett W. Norton
ATTORNEYS

United States Patent Office 3,506,106
Patented Apr. 14, 1970

3,506,106

BOBBIN STORAGE AND DELIVERY INSTALLATION

Charles W. Brouwer, East Greenwich, Henry Chain Bucheister, Providence, and Raymond V. Tata, Warwick, R.I., assignors to Leesona Corporation, Warwick, R.I., a corporation of Massachusetts Filed Sept. 12, 1967, Ser. No. 667,125
Int. Cl. B65g *47/24*
U.S. Cl. 198—33 7 Claims

ABSTRACT OF THE DISCLOSURE

A textile mill installation and apparatus for simultaneously handling various types of filled yarn bobbins. The filled bobbins are stored in a yarn spinning or twisting processing area. Each type of filled bobbin is stored in a jumbled condition in a separate storage bin at the processing area and is automatically conveyed to bobbin orienting equipment at the winding area. The various types of oriented bobbins are selectively distributed to winding stations using a particular one of the types of bobbins to wind the packages. Once the various types of jumbled bobbins have been deposited in their respective storage bins, the entire operation of orienting and distributing the bobbins is automatic. The apparatus includes a storage bin conveyor which cooperates with a delivery conveyor in avoiding scuffing and undesirable interference of the bobbins while conveying the bobbins from the processing area to the orienting equipment which automatically orients both partially and fully filled bobbins. Finally, a distributing system receives the various types of the oriented bobbins and simultaneously and automatically distributes each type of bobbin to winding stations using that type of bobbin.

This invention relates to a textile mill apparatus and, more particularly, to such apparatus which is particularly suited for handling filled yarn bobbins.

As used herein the term "bobbin" means any core or other member on which yarn is wound so that it may be moved from place to place. The term "filled bobbin" means a bobbin having a winding of yarn thereon, whether full or partially full. The term "various or different types of bobbins" means bobbins having different cores, or different yarn, or both different cores and yarn. The term "yarn" is employed in a general sense to apply to all kinds of strand material, either textile or otherwise.

As various types of filled yarn bobbins are doffed from a spinning or twisting machine, they are commonly collected and stored in boxes at the processing area. These boxes of bobbins are then carted to a winding area where they are usually dumped into another cart. A winding machine attendant moves the cart about the winding machine and orients and inserts the individual bobbins at winding machine stations. The labor cost of such an operation is considerable because of the number of people required, and there is a considerable chance of mistakes in selecting the correct type of bobbin as well as likelihood of scuffing the yarn on the bobbins.

Various attempts at automatically handling such yarn bobbins have had little, if any, commercial success. Various proposed apparatus for handling filled bobbins and delivering the bobbins to a winding area generally result in rough handling of the bobbins and possible preorientation, such as cording of the bobbins. Such attempts at automatically conveying filled bobbins from the spinning or twisting processing area to the winding area have not received general commercial acceptance. Part of the difficulty encountered with such attempted conveyor systems is that the bobbins may telescope together and require special handling to separate them before the bobbins can be accepted by the winding machine stations. Then too, scuffing and other damage to the filled bobbins is always a problem and, most equipment is entirely unsuited for handling both full and partially full bobbins which occur from time to time in doffing of the spinning or twisting machine.

These difficulties are further compounded in attempting to handle and keep separate bobbins filled with different types of yarns and there has been no appreciable overall saving through prior attempts at such automation.

The invention is, in brief, directed to an automatic installation and apparatus for storing various types of filled yarn bobbins until the bobbins are needed at a winding machine, at which time they are automatically conveyed to the winding area. The apparatus includes a storage bin conveyor which cooperates with a delivery conveyor for separating any telescoped bobbins and effectively preventing the bobbins from telescoping or scuffing as they are stored and delivered to the winding area.

It is a primary object of this invention to provide a new and improved textile mill installation and apparatus for handling bobbins.

Another object of this invention is to provide new and improved bobbin handling apparatus for a textile mill in which the installation is operable for storing filled bobbins and automatically feeding these bobbins to other apparatus.

Another object of this invention is to provide a new and improved bobbin handling installation for a textile mill in which the installation is operable for storing various types of filled bobbins and automatically feeding these bobbins to other apparatus while effectively preventing scuffing of the yarn on the bobbins.

Another object of this invention is to provide new and improved bobbin conveying apparatus having provision for storing various types of filled bobbins and conveying the filled bobbins from a storage area to bobbin receiving apparatus. A related object is provision of such apparatus for effectively preventing scuffing and other damage to the bobbins as they are conveyed. Another related object is provision for separating telescoped bobbins and effectively preventing the bobbins from telescoping.

These and other objects and advantages of the invention will be apparent from the following description and the accompanying drawings in which.

Figure 1:
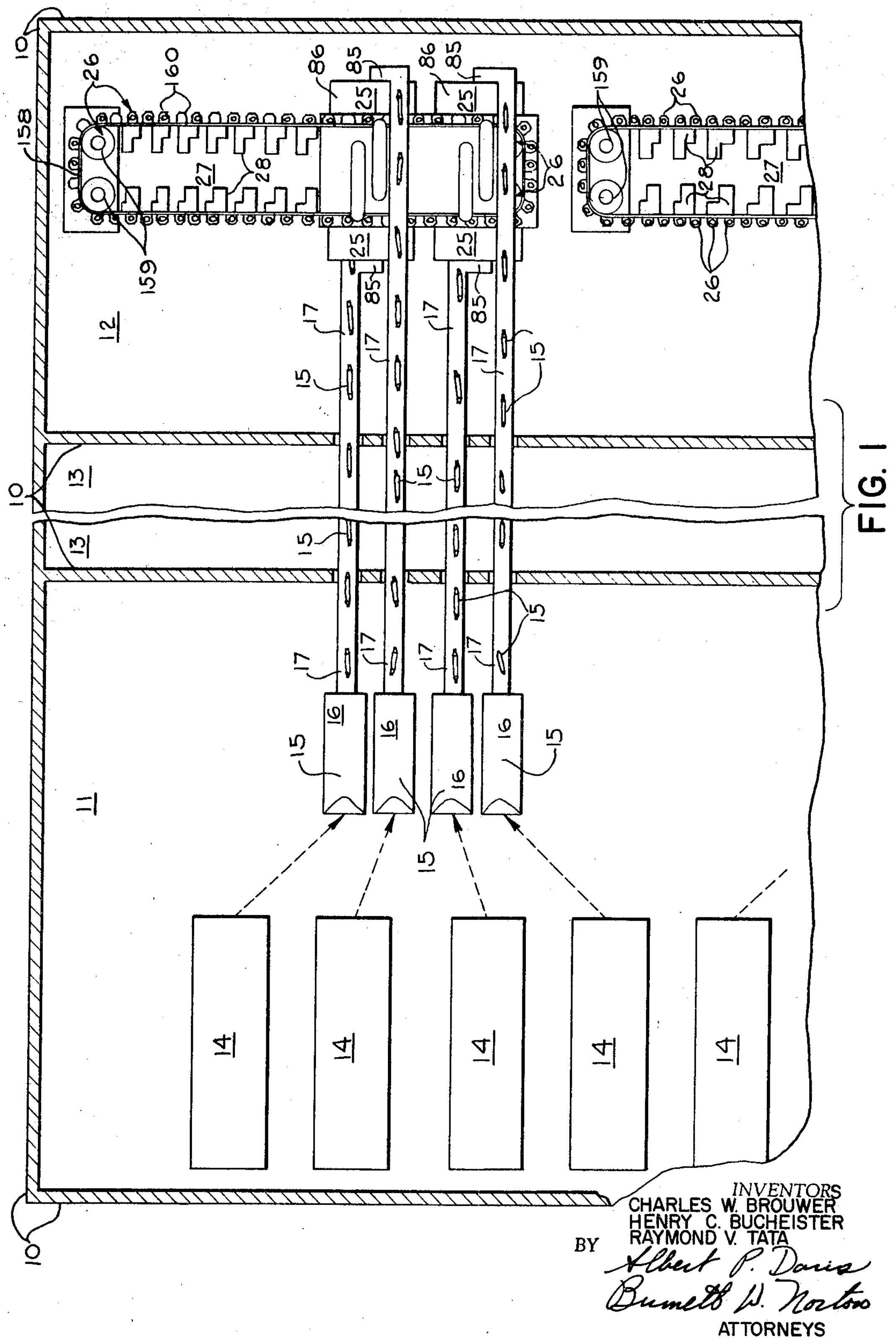
FIG. 1 is a fragmentary plan layout of a textile mill installation for handling various types of bobbins stored in a bobbin processing area and used in a winding area remote from the processing area.

Referring to the drawings, FIG. 1 shows a plan layout of a portion of a textile mill in which suitable partitions 10 separate a yarn processing area 11 and a yarn winding area 12 remote from the processing area 11. As illustrated, one or more other work area 13 may separate the yarn processing areas 11 and the yarn winding area 12 as often occurs in typical textile mills. As is common practice, a number of yarn processing machines 14, such as spinning frames or twisters, are installed in the processing area 11 for handling various types of yarn which is wound onto bobbins 15. The installation shown in FIG. 1 is capable of simultaneously handling four different types of bobbins. More or less types may obviously be handled. As the various types of filled bobbins 15 are doffed from the processing machines 14, each type is deposited in a separate storage bin 16 where the bobbins remain until they are required in the winding area 12.

As any particular type of bobbin 15 is required in the winding area 12, it is moved out of its storage bin 16 and onto a delivery conveyor 17, one for each bin 16.

Each delivery conveyor 17 cooperates with its associated bin 16 in separating any telescoped bobbins 15 and effectively preventing the bobbins from telescoping as they are moved to the winding area. A typical bobbin 15 may be seen in FIG. 10 and includes a hollow bobbin core 18 having a large end 19 and a smaller opposite end 20 capable of telescoping into the hollow of the large end 19. Yarn Y (FIG. 10) is wound on an outer frusto-conical surface of the core and is spaced inwardly of the opposite ends 19 and 20. In order to expedite doffing at the spinning or twisting machines 14, the filled bobbins 15 are stored in the bins 16 in a jumbled condition, that is, with no prescribed orientation between the bobbins.

The delivery conveyors 17 carry the bobbins 15 from the processing area 11, through any intermediate areas 13, to the winding area 12 and discharges the bobbins into bobbin orienting apparatus 25, one such apparatus associated with each conveyor 17 for handling one type of bobbin.

Each orienting apparatus 25 receives its bobbins 15 in jumbled condition and delivers the bobbins with their large ends 19 downward to distributing apparatus 26 associated with a winding machine 27 which uses the bobbin 15 to wind packages P, as is well known in the art. The distributing apparatus 26 receives the various types of bobbins 15 from each of the orienting apparatuses 25 and delivers the correct type of bobbin 15 to winding spindles or stations 28 of the winding machine 27.

Thus, the various types of bobbins 15 may each be stored in jumbled condition in the processing area 11 and conveyed in jumbled condition from the processing area to the bobbin orienting equipment 25 in the winding area 12 where the bobbins are oriented as required for use by the winding machine 27. It is often desirable to simultaneously wind various types of yarn on a winding machine 27, and the bobbins distribution system or apparatus 26 provides for a completely automatic distribution of the bobbins to the winding machine.

Figure 2:
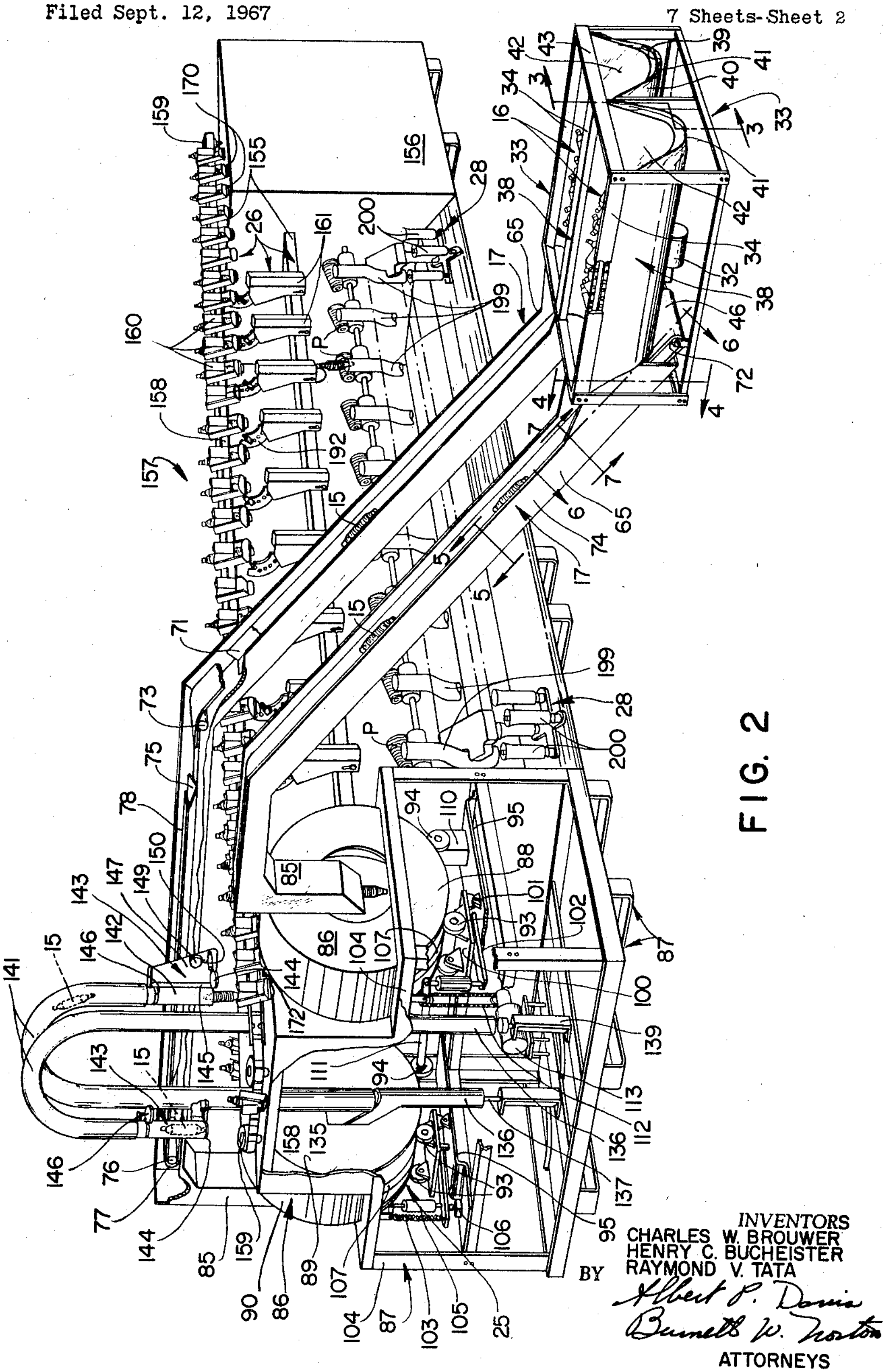
FIG. 2 is a perspective view of a prototype apparatus generally suitable for use in the installation shown in FIG. 1, with parts broken away and removed for clearer illustration.

In FIG. 2 a prototype apparatus suitable for use in the installation shown in FIG. 1 is illustrated. For simplicity of illustration this apparatus is shown for simultaneously handling two types of bobbins 15, but any number of types may be processed simultaneously. The filled bobbins 15 are deposited in jumbled condition in the storage bins 16 which are also conveyors, one type of bobbin 15 in each of the bins. The bins may be identical in construction and, as illustrated, each is operated by its own motor 32 for conveying the stored bobbins out of the bin.

Figures 3, 4, 5:
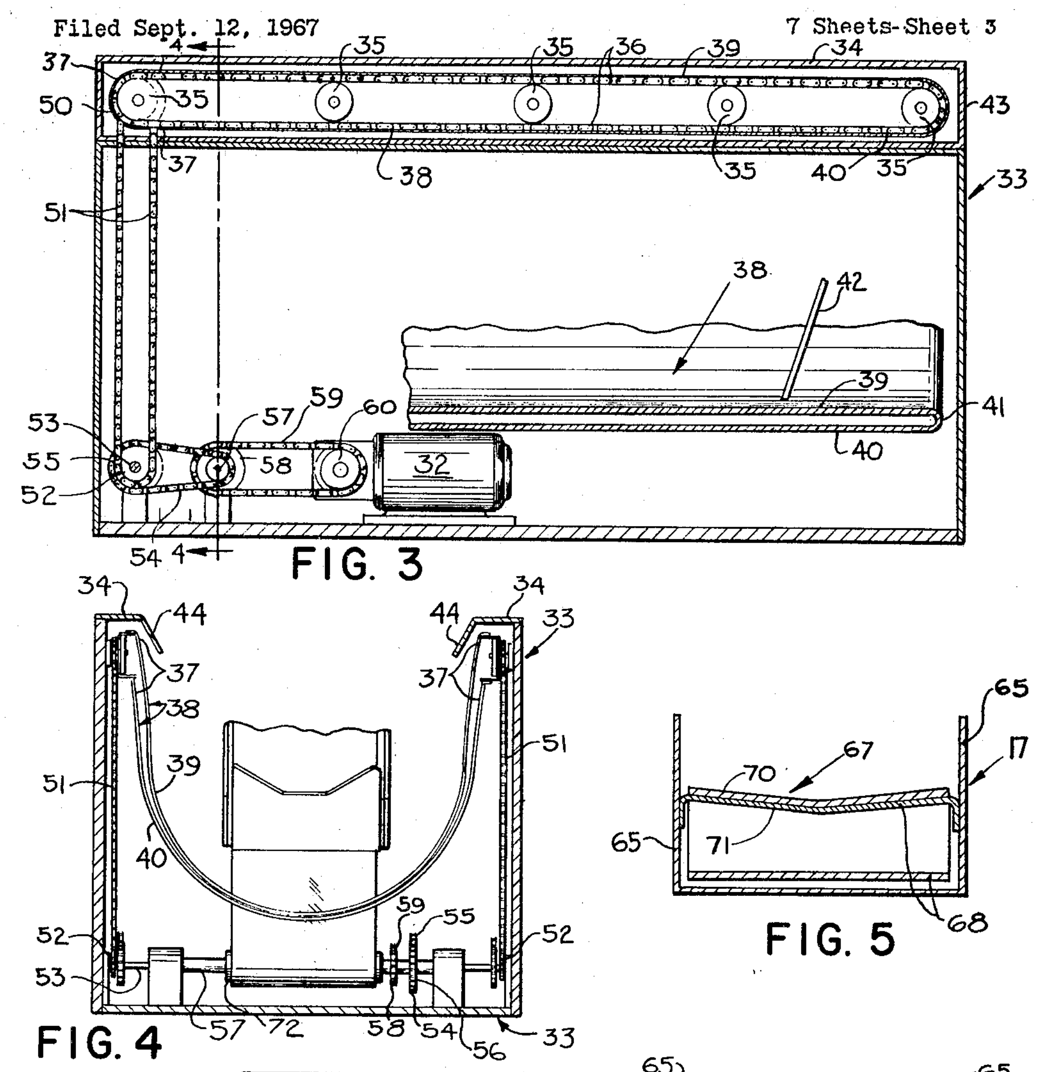
FIG. 3 is an enlarged, fragmentary, schematic vertical sectional view taken generally along the line 3—3 in FIG. 2.
FIG. 4 is an enlarged, fragmentary, schematic vertical sectional view taken generally along the line 4—4 in FIG. 2 (and also in FIG. 3)
FIGS. 5–7 are enlarged, fragmentary, schematic sectional views taken generally along the lines 5—5 through 7—7, respectively, in FIG. 2.

Each storage bin 16, as shown in FIGS. 2, 3 and 4, comprises a suitable frame 33 including opposed longitudinal upper members 34 each carrying a set of chain sprockets 35 generally horizontally aligned. Each set of sprockets 35 carries a continuous chain 36. Opposite edge portions 37 of a continuous bobbin receiving conveyor belt 38 are attached, one to each of the chains 36 so as to provide an upper conveyor belt run 39 and a lower run 40 having opposite ends with returned portions 41 at opposite ends of the belt 38. The upper and lower runs of the belt 38 form a deep sag, illustrated at a depth about the same as the width of the belt between the chains 36. A rigid tongue 42 (FIGS. 2 and 3) is secured to a rear upper cross member 43 of the frame 33 and depends at a slight angle from the vertical, into the sag of the conveyor belt 38 and conforms generally to the configuration of the belt when the conveyor belt is loaded with jumbled bobbins 15. This tongue 42 declines from the frame member 43 inwardly of the adjacent return portion 41 of the belt 38 so that bobbins cannot drop off the adjacent end of the belt. Beveled flanges 44 of the upper side frame members 34 covers the belt edges 37 and the chains 36. A discharge end 45 of the belt 38 is opposite the tongue 42 and is positioned above a bobbin receiving end 46 of the delivery conveyor 17 for passing bobbins from the bin 16 onto the delivery conveyor.

The upper run 39 of the bin conveyor belt 38 is moved away from the tongue 42 toward the discharge end 45 of the bin by operation of its supporting chains 36 (FIG. 3) which are driven by their sprockets 35 at the discharge end of the conveyor. Each driven sprocket 35 is mounted for rotation with a concentric upper drive sprocket 50 driven by a vertically disposed continuous chain 51 engaging a lower drive sprocket 52 at the bottom of the frame 33. The lower drive sprockets 52 are mounted for rotation with a common shaft 53 journaled on lower members of the frame at the discharge end of the bin. This shaft 53 is driven by a suitable chain drive 54 including another, larger sprocket 55 on the shaft 53 connected with a smaller sprocket 56 on a delivery conveyor roller shaft 57 suitably journaled on the lower frame members. The delivery conveyor shaft 57 carries another sprocket 58 which forms part of a chain drive 59 from a sprocket 60 on a drive shaft of a gear box of the motor 32 mounted on the lower frame members.

Once the bobbins 15 are deposited on the belt 38 of the storage bin 16, the bobbins move as a mass and there is substantially no relative movement between adjacent bobbins or between the bobbins and the bin conveyor belt.

Figure 6:
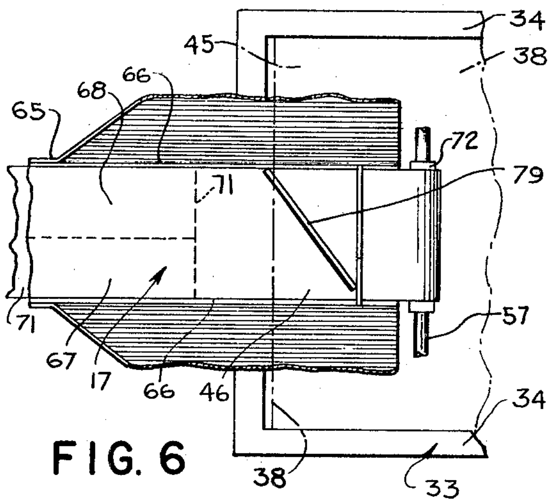
Figure 7:
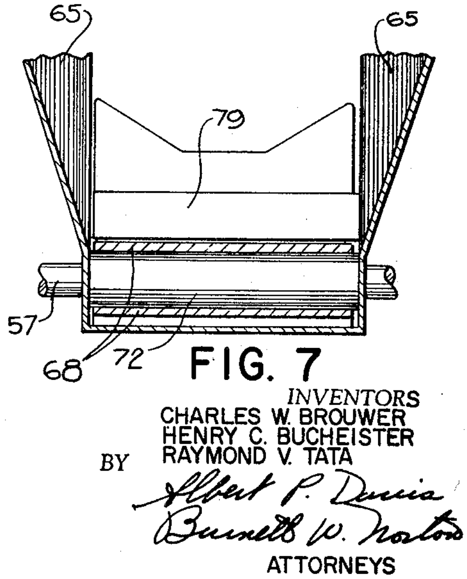

The delivery conveyor (FIGS. 2 and 6) has a frame 65 and mounted thereon between opposed bobbin retaining walls 66 is a continuous bobbin receiving belt 67 having a high friction surface 68 such as foam rubber or the like, such that the bobbins 15 do not slide on this belt.

An upper run 70 of the delivery belt 67 rides on and conforms to the shape of a first upwardly opening V-shaped support 71 which is slightly spaced from a drive roller 72 fixed to the shaft 57 and from an idler roller 73 (FIG. 2) at the top of an inclined portion 74 of the conveyor, and on a second V-shaped support 75 which is slightly spaced from the idler roller 73 at the top of the incline and a second idler roller 76 at a discharge end 77 of a horizontal upper run 78 of the delivery belt. Thus, if a bobbin 15 is disposed to roll on the inclined portion 74 of the delivery belt it will roll toward the center of the belt and align itself with the belt. Should a bobbin roll downwardly on the inclined portion 74 of the delivery belt 67 toward its receiving end 46 below the bin conveyor belt 38, a diagonal member 79 (FIG. 6) is fixedly secured to the conveyor frame 65 slightly above the upper run of the delivery belt, and is positioned to cant the bobbin 15 so that the bobbin can not fall off this end of the belt and will be carried with the belt rather than rolling on the belt.

As the bobbins are discharged from the bin 16 they pass downwardly at an incline about a bobbin length and onto the upwardly inclined portion 71 of the delivery conveyor 17. Thus, any telescoped bobbins 15 in the bin 16 tend to separate as they pass from the bin to the delivery conveyor. Furthermore, the drive ratio of the bin conveyor belt 38 to the delivery conveyor belt 67 is preferably 1:10, or other suitable ratio, such that the delivery conveyor belt 67 travels at a substantially higher linear speed than the bin conveyor belt 38. Therefore, as the first of a pair of telescoped bobbins passes onto the delivery conveyor belt 67 it tends to move away from the other telescoped bobbin which is still on the bin conveyor belt and thus separates from the other bobbin.

Figure 8:
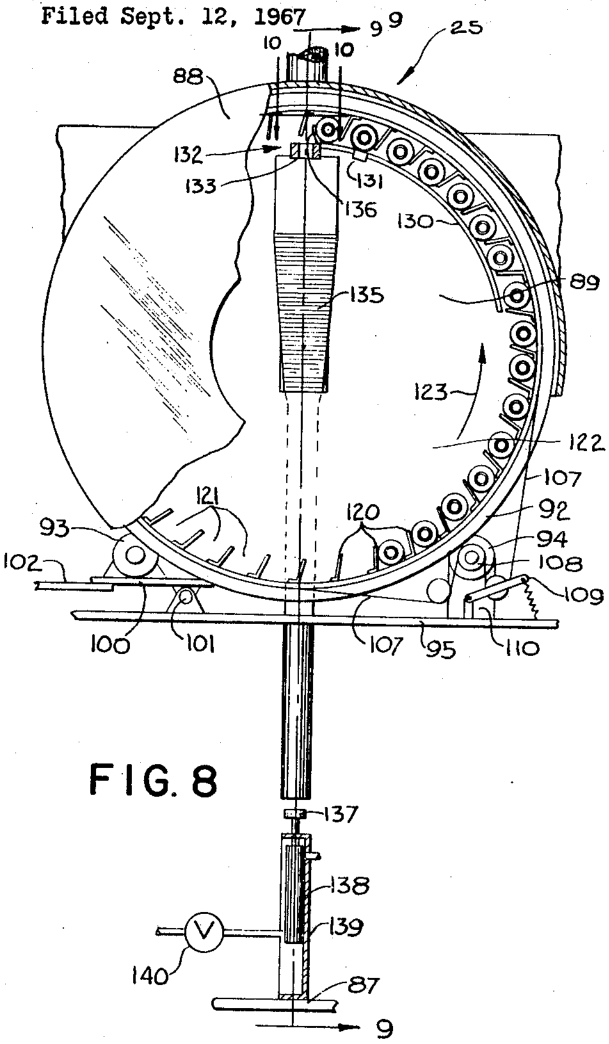
FIG. 8 is an enlarged, fragmentary, schematic side view of a portion of the apparatus shown in FIG. 2, with parts broken away and removed for clearer illustration.
Figure 9:
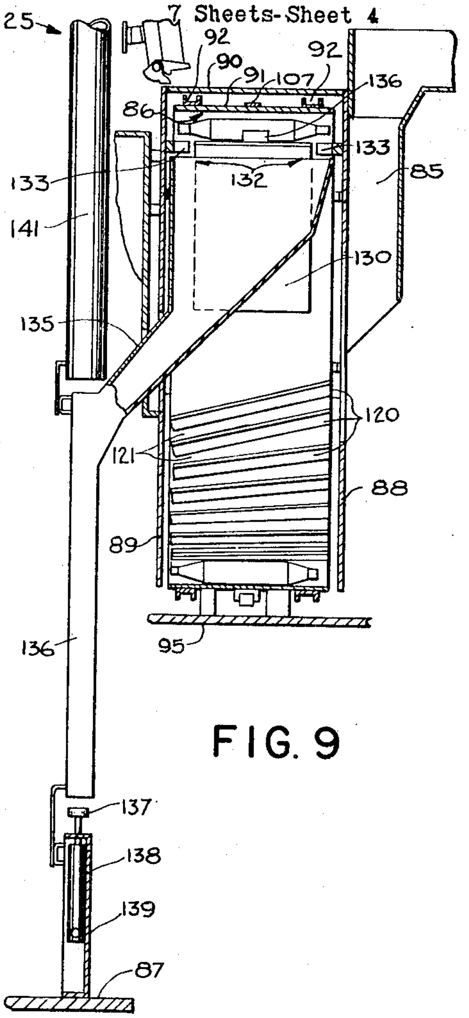
FIG. 9 is a fragmentary vertical sectional view taken generally along the line 9—9 in FIG. 8.

When the associated orienting apparatus requires bobbins, the bin conveyor 16 and delivery 17 are operated and bobbins 15 pass from the discharge end 77 of the delivery conveyor belt 67 to the orienting apparatus 25 and, more particularly, downwardly through a chute 85 and into a bobbin orienting drum 86 as may best be seen in FIGS. 2, 8 and 9.

A frame 87 (FIG. 2) of the orienting apparatus fixedly mounts a front bobbin inlet wall 88 and rear bobbin outlet or end wall 89 of the drum. A cylindrical housing 90 is fixedly secured to upper portions of these end walls. A rotatable cylindrical drum sidewall member 91 is positioned between these end walls 88 and 89 and within the housing 90 and carries a pair of circumferentially extending tracks 92 fixed to its outer surface. Each track 92 is received by two circumferentially spaced wheels 93 and 94 mounted on a drum base 95 fixedly secured to the orienting apparatus frame 87. As herein illustrated, each of the circumferentially spaced wheels are opposite similar wheels which receive the other track. One pair of the opposed wheels 94 is suitably journaled on the base 95. A second pair of opposed wheels 93 is journaled on a carriage 100. This carriage 100 is pivotally mounted by a pin 101 at one end on the base 95 and, as shown in FIG. 2, has a rigid tongue 102 fixed to and extending from an opposite end. A free end of this tongue is supported by a tension spring 103 depending from a member 104 of the orienting apparatus frame 87. A dash pot 105 smooths the action of the carriage and tongue. When this tongue 102 is depressed it engages an actuator of a switch 106 connected in circuit with the drive motor 32 of the associated bin 16 and delivery conveyor 17 to stop this motor and thus to stop delivery of bobbins to the drum 86. Thus, as bobbins are deposited in the drum 86 the weight of the drum increases and eventually causes th switch 106 to be actuated, stopping the motor and therefore delivery of bobbins.

The cylindrical drum sidewall member 91 is rotated by a belt 107 extending circumferentially about the drum and about a drive wheel 108 journaled on the base 95. An idler pulley assembly 109 (FIG. 8) maintains the drive belt 107 taut. The drive wheel 108 is driven through a suitable electrically actuated clutch 110, mounted on the base 95, by means of a shaft 111 constantly driven by a chain drive 112 from a continuously operating motor 113. This shaft 111 carries a similar drive wheel and clutch for the other orienting drum.

A plurality of flights or flanges 120 extend generally transversely across the inner surface of the rotatable sidewall 91 and spaced apart sufficiently for receiving but a single filled bobbin 15 longitudinally aligned in a channel 121 defined by adjacent flanges 120. The stationary end walls 88 and 89 of the drum are spaced apart sufficiently so that but one bobbin 15 can be received lengthwise therebetween. As the bobbins are deposited from the delivery conveyor 17 through the chute 85 and into a hopper portion 122 (FIG. 8) of the drum between the end walls 88 and 89 and in the lower portion of the drum inwardly of the flanges 120, the bobbins 15 tumble slightly until they are received in one of the upwardly opening channels 121 at a lower portion of the drum.

As the sidewall member 91 is rotated, counterclockwise as shown by the arrow 123 in FIG. 8, the bobbins in the channels 121 are conveyed upwardly and any bobbins 15 not in a channel but carried along with the sidewall member 91 will fall toward the lower portion of the drum 86 to be subsequently received in a channel 121. As may best be seen in FIG. 9, the channels are disposed so that as they are ascending, and as they pass through an intermediate position in which they open downwardly so the bobbins could fall out of the channels, the channels 121 decline across the sidewall member 91 and, as the sidewall member continues to move upwardly the bobbins carried by the channels roll against a generally cylindrical guide member 130 in the upper portion of the drum between the intermediate position and a discharge position of the channels at the top of the drum. This guide member is secured to the stationary end walls 88 and 89 of the drum and the bobbins are therefore caused to roll on the guide member. Because of the inclination of the flanges 120, as the bobbins 15 roll on the guide member 130 they move in the direction of the declination and against the rear outlet or end wall 89. Normally, the cylindrical sidewall member 91 continues to rotate until a bobbin carried in one of its channels engages a switch actuator to close a switch 131 secured to the guide member 130 at the top of the drum and just inwardly of the upper end of the guide member. Closing this switch 131 causes the clutch 110 to disengage thereby stopping rotation of the sidewall member 91.

Figure 10:
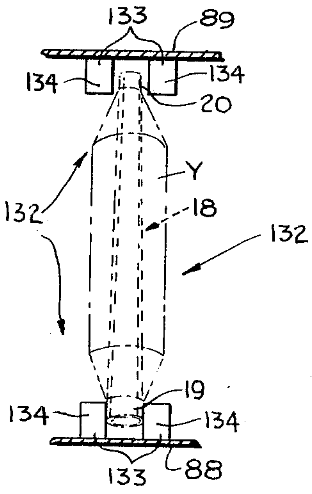
FIG. 10 is an enlarged, schematic sectional view taken generally along the line 10—10 in FIG. 8.

When a bobbin 15 is required, the sidewall member 91 is again rotated (through operation of a control system to be described) and deposits the bobbin 15, which had been depressing the actuator of the switch 131, into a gauging assembly 132. The gauging assembly 132 is shown in FIGS. 8, 9, and 10 and includes a pair of opposed gauges 133, one secured to each of the stationary sidewalls 88 and 89. The top surfaces of the gauges are generally coplanar with the top surface of the guide member 130. The gauges 133 each include a pair of abutments 134 (FIG. 10) spaced apart sufficiently to pass only the small end 20 of the bobbin 15 but not the large end 19 of the bobbin. Therefore, the small end 20 of the bobbin falls between the adjacent gauge abutments 134 and the bobbin 15 pivots downwardly with its large end 19 supported on the other gauge 133 so that the bobbins pass out of the drum 86 through a discharge chute 135, opening through the drum end wall 89, always with their small end 20 first. A resilient finger 136 is mounted on and extends upwardly from the upper end of the guide member 130 to lift any partially full bobbins 15 so that they will be properly positioned for receipt by the gauges 133.

The discharge chute 135 declines into a generally vertical tube 136 which is open at its bottom end so that the small end 20 of the bobbin 15 comes to rest on the upper face of a plunger or platform 137 of a double acting accelerator drive cylinder 138 suitably mounted on a post 139 on the orienting apparatus frame 87. The bobbin 15 remains seated on the plunger 137 until another bobbin 15 is required by the distributing apparatus 26, whereupon the accelerator cylinder 138 is actuated by operation of a solenoid valve 140 (FIGS. 8 and 24) to drive its plunger 137 upwardly. The plunger is returned, upon release of the valve 140 by low air pressure (about 10 p.s.i.) introduced at the top of the cylinder. The plunger 137 (FIGS. 2 and 9) accelerates the bobbin 15 through the vertical tube 136 and into and through a rigid arcuate inverting tube 141 terminating in a downwardly opening tube 142 of a bobbin holder 143 (FIGS. 2 and 12) which is closed at its bottom end by a gate 144 (FIG. 2) which receives the bobbin 15. This gate 144 is fixedly mounted at the lower end of a vertical shaft 145 which carries a similar gate 146 at its upper end, the two gates 144 and 146 being disposed so that when the lower gate 144 is closed the upper gate 146 is open. The shaft 145 is journaled on a fin 147 fixed to the tube 142. The lower gate 144 is connected with a plunger of an actuating cylinder 150 which is operated when a solenoid valve 149 is energized, to open the lower gate 144 and close the upper gate 146, and when valve 149 is deenergized and the operating pressure is thus released the cylinder returns the lower gate 144 to closed position and the upper gate to open position. A return spring or a double acting cylinder may be used to return the gates. A bobbin 15 is dropped from the gate 144 substantially simultaneously with accelerating of another bobbin 15 by the accelerator cylinder 138. Normally a bobbin 15 passing through the arcuate tube 141 drops directly onto the lower gate 144 ready for discharge from the orienting apparatus 25 to the distributing system 26, but a partially full bobbin 15 or other light bobbin may move more rapidly and be momentarily retained on the closed upper gate 146 before dropping to the lower gate 144 for later discharge to the distributing conveyor 26.

With reference to FIGS. 1, 2, and 11–17, the distributing system 26 includes a frame 155 mounted on the orienting frame 87 and on a frame of the winding machine 27 within a console 156. The distributing system also includes a distributing conveyor 157, in the form of a continuous belt 158 which has pairs of upper and lower wheels guided in horizontal tracks 159*a* (FIG. 17) and about pairs of pulleys 159 mounted on the distributing frame 155 at either end of the belt 158. The belt carries sets each including a plurality of bobbin receiving buckets 160, one set for each type of bobbins being handled. The buckets 160 of each set are preferably alternated on the belt 158 with buckets of the other sets. These buckets 160 cross open tops of bobbin receivers 161 secured to the distributing frame 155. A bobbin receiver 161 is positioned above each of the winding machine stations 28.

Figures 11, 12, 13, 14, 15, 16:
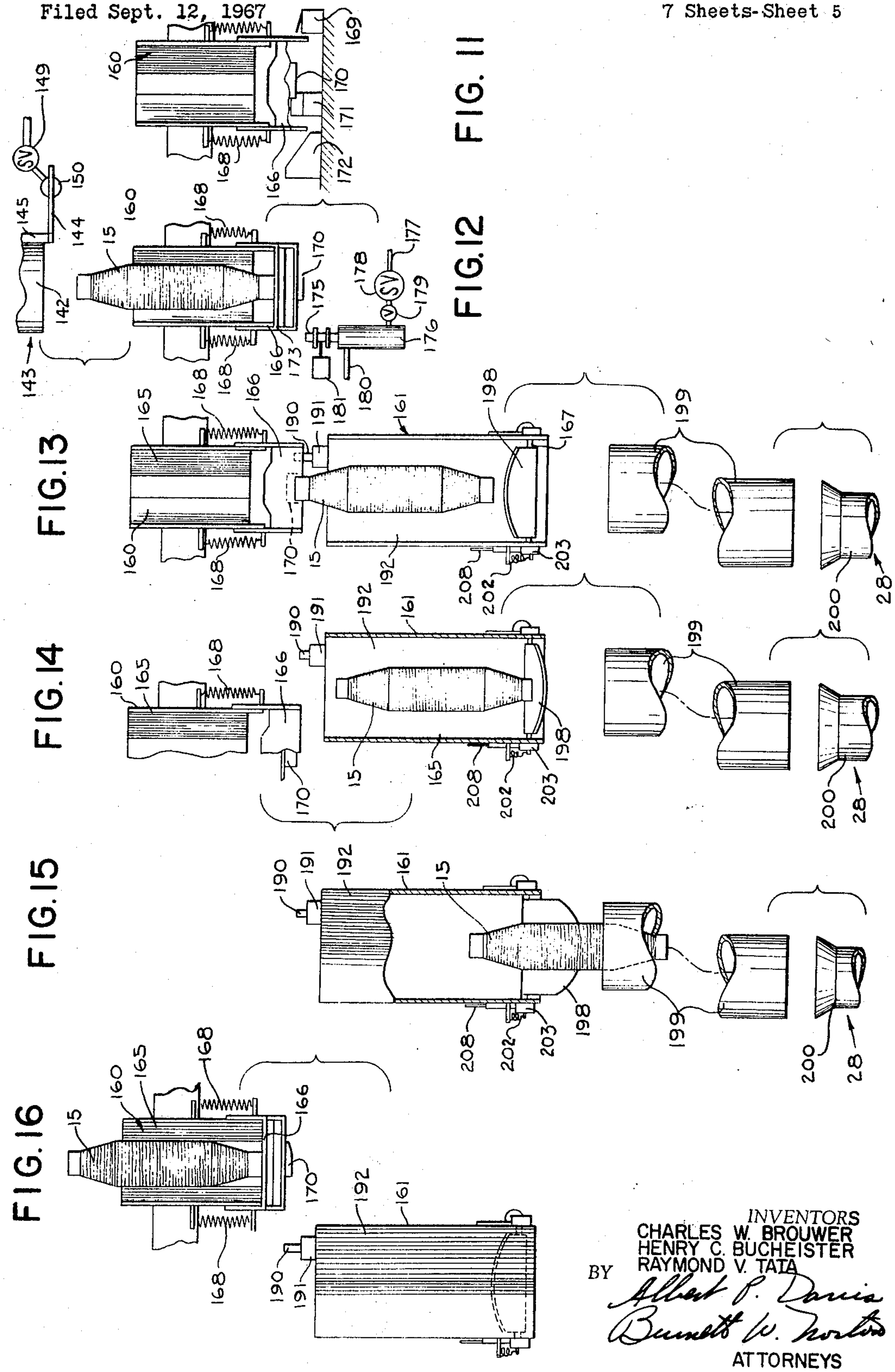
FIGS. 11–16 are enlarged, fragmentary schematic elevational views of a portion of a bobbin distributing system shown in FIG. 2, these figures illustrating progressive steps in the operation of the distributing system, with parts broken away and removed for clearer illustration.

Each bucket 160 has a body 165 and a bobbin retaining gate 166 which pivots about horizontal studs 167 (FIG. 17) mounted on the body 165 for movement of the gate 166 from an upper closed position for retaining a bobbin 15 in the body 165, to a lower open position for discharging the bobbin into a receiver 161. A pair of overcenter springs 168 (FIGS. 17 and 18), one on either side of each bucket and secured to the bucket body 165 and to the gate 166 maintains the gate 166 closed and upon slight opening movement of the gate causes the gate to move rapidly to open position. When one of the buckets 160 is empty its gate 166 therefore remains open and passes across an actuator of an associated switch 169 (FIGS. 11 and 24) on the distributing conveyor frame 155, just upstream of the associated bobbin holder 143 from which the empty bucket 160 is to receive a bobbin 15. A cam 170 (FIGS. 2, 11–14 and 16–18) on the empty bucket gate 166 closes this switch 169 which actuates the solenoid valve 149 of the associated holder 143, actuating cylinder 150 to open the lower holder gate 144 and discharge a bobbin 15 into the bucket 160 whose gate 166 has just been closed by closing cams 171 and 172 (FIGS. 2 and 11) on the distributor conveying frame 155 downstream of the switch 169. These cams 171 and 172 may best be seen in FIG. 11. A first of these closing cams 171 engages the bucket cam 170 to urge the gate 166 toward closed position and when the gate is partially closed a side edge 173 (FIG. 12) of the gate engages the second closing cam 172 which moves the gate overcenter whereupon the springs 168 fully close the gate. Thus, with the bucket gate 166 closed, the lower gate 144 of the holder 143 opens and a bobbin 15 drops into the bucket 160 as shown in FIG. 12.

If for any reason a bobbin 15 is not in the holder 143 for delivery to the empty bucket 160, an abutment pin 175 (FIG. 12) is moved upwardly to engage the bucket cam 170 and again open the bucket gate 166 so that the next time the bucket 160 passes the holder 143 it may again actuate the switch 169 and cause the holder 143 to deliver a bobbin 15. This abutment pin 175 is the free end of a plunger of a double acting actuating cylinder 176 having a high pressure air line 177 (80 p.s.i.) connected through a normally closed solenoid valve 178 and a reverse flow metering valve 179 into the end of the cylinder 176 opposite the plunger to move the plunger to extended position when the solenoid valve is opened. Low pressure air (10 p.s.i.) is applied, through a supply tube 180, to the opposite end of the cylinder to return the plunger, and slow plunger return is assured by the metering valve 179 so that the plunger remains extended for a period just sufficient to reopen the gate 166 of the empty bucket 160. A switch 181 (FIGS. 12 and 24) opens when the plunger is extended to prevent operation of the accelerator valve 140 and holder valve 149, as will be described more fully.

Figures 17, 18, 19, 20:
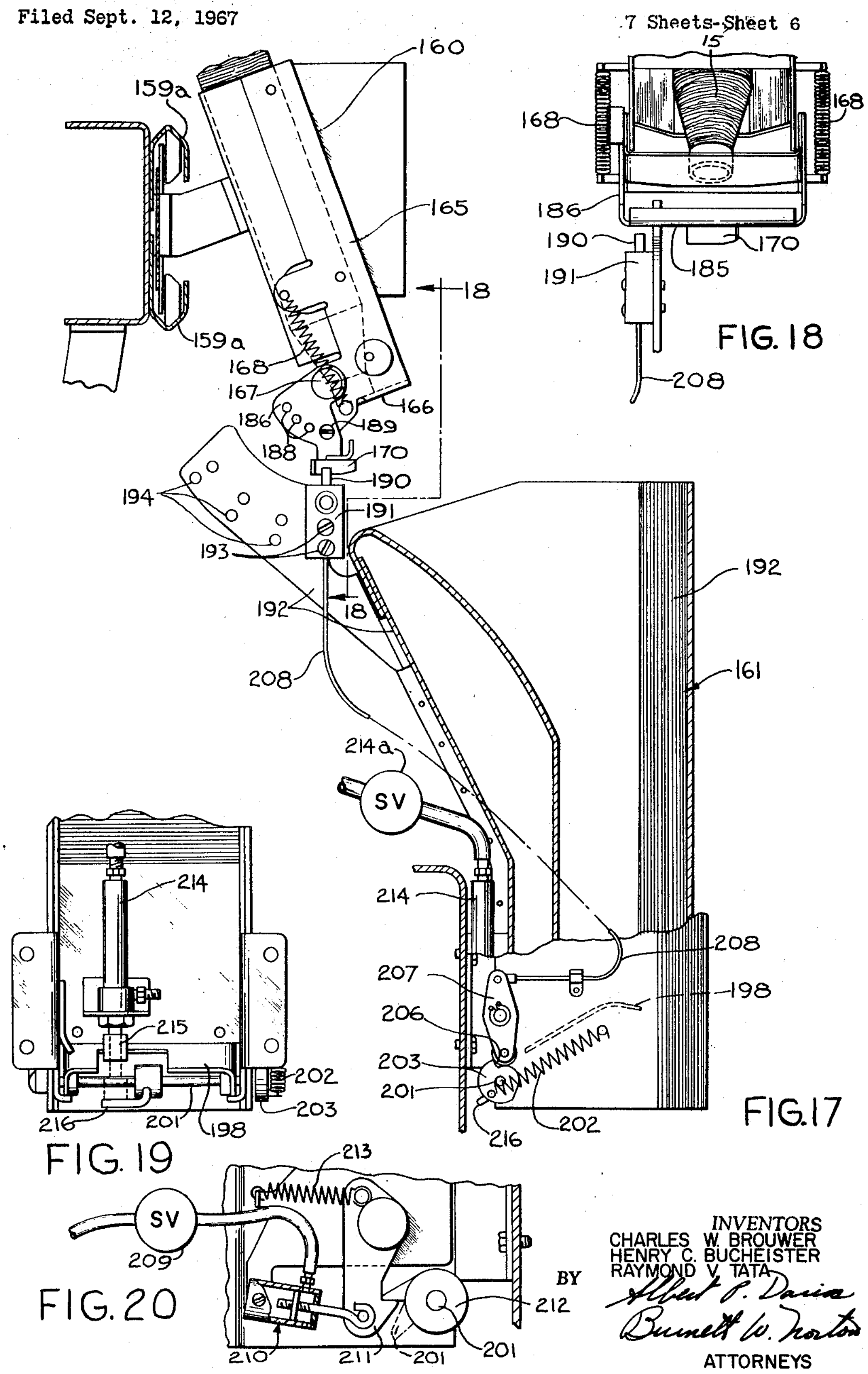
FIG. 17 is an enlarged, fragmentary schematic elevational view of one side of a portion of the distributing system shown in FIG. 2 and in FIGS. 11–16 with parts broken away and removed for clearer illustration.
FIG. 18 is a fragmentary vertical sectional view taken generally along the line 18—18 in FIG. 17.
FIG. 19 is a fragmentary, schematic rear view of a portion of the apparatus shown in FIG. 17.
FIG. 20 is a fragmentary, schematic side view of the opposite side of a portion of the apparatus shown in FIG. 17.

There is a separate actuating switch 169 (FIG. 11) and set of closing cams 171 and 172 for each bobbin holder 143 of each section of associated orienting apparatus, that is, for each type of bobbin 15 being handled. The cams 170 on the bucket gates 166 are adjustable to fixed positions, one such position for each type of bobbin 15 being handled. With reference to FIGS. 17 and 18, these cams 170 are fixed on the bights 185 of U-shaped bails 186. Free ends of the bail 186 are pivotally mounted on the respective gate by studs 167, and have bolt holes 188, one for each type of bobbin to be handled. These holes 188 are in a circular pattern concentric with the rivets 187, and each hole may be aligned with a threaded bolt hole in the bucket gate 166 to receive a bolt 189 and secure the bail 186 and the cam 170 in adjusted position.

The bucket 160 now carries its bobbin 15 until one of the winding stations 28 of a winding section which uses this type of bobbin demands another bobbin. When this occurs a delivery abutment pin 190 (FIGS. 13–18), slidably mounted in a body 191 adjustably secured on a body portion 192 of the bobbin receiver 161, is raised to engage the bucket gate cam 170 and open the gate 166 as shown in FIG. 13. A pair of bolts 193 secure each body 191 to an arm of the associated receiver body, and these bolts may mate with any of a plurality of sets of threaded bores 194, one set corresponding to each type of bobbin. Thus these pins 190 and gate cams 170 may be adjusted not to interfere with similar components of other sections handling different bobbins. When the pin 190 opens the gate 166, the bobbin 15 drops into the receiver 161, and onto a receiver gate 198 which hold the bobbin until the associated winding station 28 again requires a bobbin, whereupon the receiver gate 198 opens (FIG. 15) and the bobbin 15 is discharged through a tube 199 and into a creel 200 of the winding station 28. This creel 200 is part of the winding station 28, and may be of the type provided in Winding Machine No. 644 manufactured by Leesona Corporation, Warwick, R.I., and a suitable winding station control is disclosed in a Leesona Corporation U.S. Patent No. 3,081,045 granted to Thomas E. Pitts and Carlton A. Steele on Mar. 12, 1963.

Figures 21, 22:
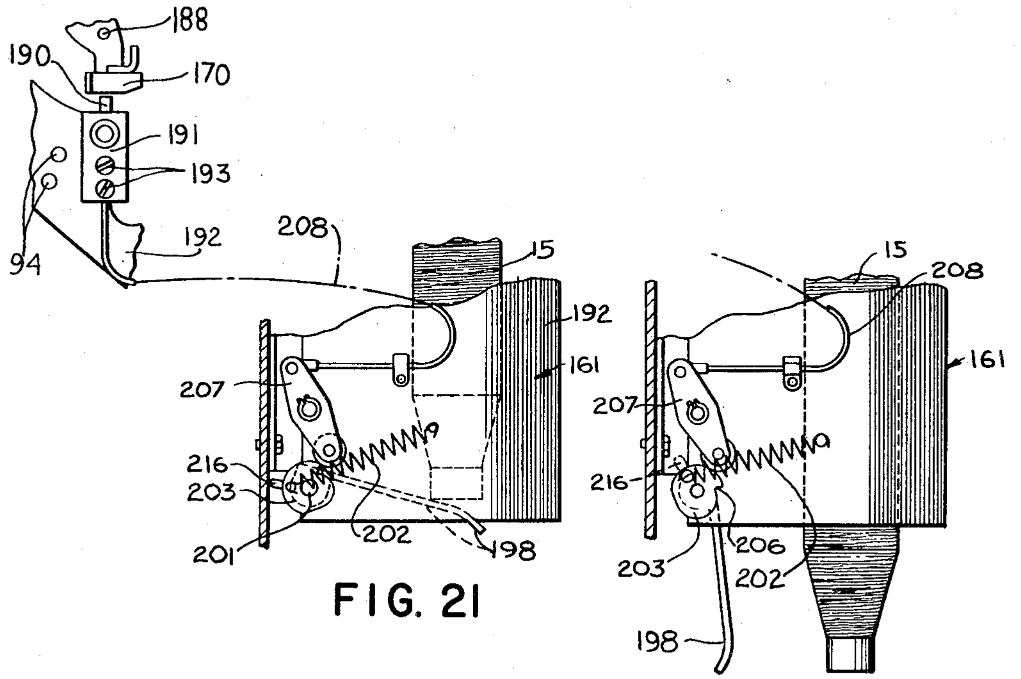
FIG. 21 is a fragmentary, schematic, compressed side view similar to FIG. 17 showing the apparatus in a different operating position, with parts broken and removed for clearer illustration.
FIG. 22 is a fragmentary, schematic side view similar to FIG. 21 with the apparatus in still another operating position.

As the bobbin 15 passes from the bucket 160 into the receiver 161, it engages the receiver gate 198 which is fixed to a shaft 201 journaled in the receiver body 192 and held in position by an overcenter spring 202 secured to a cam 203 and to the body 192 of the receiver 161 to maintain the gate 198 in a waiting position inclined slightly upwardly from the shaft 201 as shown in FIGS. 13, 16 and 17. This gate moves overcenter as the bobbin engages the gate and the weight of the bobbin moves the gate to a bobbin holding position shown in FIGS. 14 and 21. In moving to a bobbin holding position, the receiver gate 198 which is fixed to the shaft 201 journaled in the receiver body 192, causes rotation of the shaft 201 and the cam 203 secured to an outer end of the shaft moves the cam to the position shown in FIG. 21. This movement of the cam 203 causes an abutment 206 on the cam to move a pivoted lever 207 from the position shown in FIG. 17 to the position shown in FIG. 21 and such movement is transmitted through a cable 208 to lower the bucket opening pin 190 so that subsequent buckets 160 will not be opened to discharge a bobbin 15 into this now full receiver 161. When the winding station 28 requires another bobbin 15, it produces a signal (to be described) which operates a solenoid valve 209 (FIGS. 20 and 23) to actuate a small cylinder 210 on a side of the receiver body 192 opposite the previously described cam 203 and lever 207. Actuation of this cylinder 210 withdraws a keeper 211, pivoted to the side of the receiver body 192, from holding engagement with a latch 212 fixed to the receiver gate shaft 201 so that the weight of the bobbin 15, and the overcenter spring 202, causes the latch to rotate (dotted lines in FIG. 20) and the gate 198 to open rapidly permitting the bobbin 15 to drop into the tube 199 for passage into the creel 200. Upon discontinuance of the signal from the winding head the pressure in the opening cylinder 210 is released and a spring 213 connected between the keeper 211 and the receiver body 192 moves the keeper 211 back to latching position. A predetermined time after the opening cylinder 210 has operated, a solenoid valve 214*a* is opened and operates a closing cylinder 214, fixedly mounted on the back of the receiver body 192, has a plunger 215 which moves downwardly and depresses a finger 216 extending outwardly from the receiver gate shaft 201 to swing the shaft 201 and the gate 198 to the waiting or receiving position and the overcenter spring 202 maintains the gate in this position until another bobbin 15 drops into the receiver.

Figure 24:
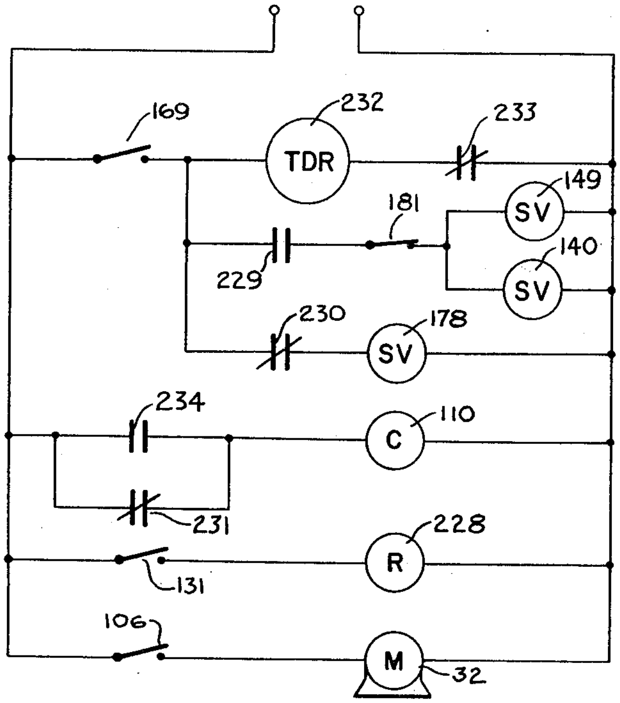
FIG. 24 is a diagram of another portion of the control system.
Figure 23:
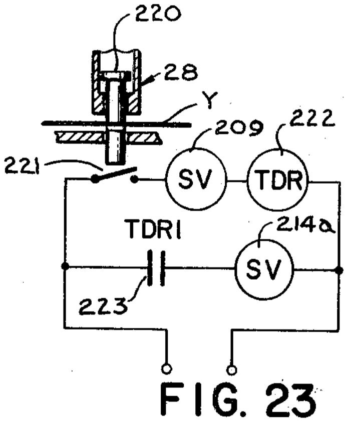
FIG. 23 is a diagram illustrating a portion of a control system for the installation shown in FIG. 1 and the apparatus shown in FIG. 2.

The control system for the installation is shown in FIGS. 23 and 24. Operation of the system is controlled from the winding stations 28 which signal for release of a bobbin from its associated receiver 161, which in turn signals a bucket 160 to deliver a bobbin 15 to the receiver. The empty bucket cam 170 closes the switch 169 to operate the holder 143 to deliver a bobbin to the empty bucket whose gate is previously closed by the cams 171 and 172, and to fire another bobbin from the accelerator plunger 137 to the holder.

Each winding station 28 includes a control unit which automatically calls for an additional bobbin 15 as needed. This unit is fully described in the previously mentioned Leesona Corporation patent. To simplify an understanding of the function of this unit, an alternate form of winding station signalling system is shown in FIG. 23. When the yarn Y is being withdrawn from a bobbin 15 at the winding station 28, the yarn maintains a yarn sensing pin 220 in an elevated position. As the yarn Y is exhausted from the bobbin, the tail end of the yarn Y passes by the sensing pin 220 and the pin drops to close a switch 221 thereby energizing a signal system. As soon as the switch 221 is closed, the solenoid valve 209 of the receiver gate opening cylinder 210 is actuated to release the receiver gate 198 and a bobbin 15 in the receiver is delivered through the tube 199 to the creel 200 associated with this winding station 28. A time delay relay 222, in series circuit with this solenoid valve 209, is of the initial delay type and at the end of this delay operates to close its relay contact 223, thereby energizing the solenoid valve 214*a* of the closing cylinder 214 and actuating the closing cylinder to move the gate 198 to waiting or receiving position. This time delay is sufficient for the bobbin 15 to pass from the receiver 161 into the tube 199 leading to the creel 200. A normal end finding function of the winding station 28 causes the starting end of yarn Y from another bobbin 15 to elevate the sensing pin 220, whereupon the switch 221 opens.

With reference to the portion of the control system shown in FIG. 24, as the distributing conveyor 26 moves an empty bucket to close the delivery switch 169 (FIG. 11) on the distributing conveyor frame, if the switch 131 in the orienting drum 86 is closed, indicating a bobbin 15 is in position for delivery to the drum gauge mechanism 132, a relay 228 is energized closing its contact 229 so that the solenoid valve 149 is energized and the holder cylinder 150 operates to deliver a bobbin 15 to the empty bucket 160; and the solenoid valve 140 to the bobbin accelerator cylinder 138 is energized so that a bobbin is accelerated through the inverting tube 141 and drops onto the lower holder gate 144 (which opens and closes while the bobbin is traveling through the tube 141). If a bobbin 15 is not present at the top of the barrel, the switch 131 will be opened so that the relay 228 in circuit with this switch 131 is not energized and its contact 229 therefore remains open, thus preventing the solenoid valves 140 and 149 of the accelerator 138 and the holder 143, respectively, from being energized and the holder and accelerator remain inoperative. (The bobbin present switch 131 at the top of the drum 86 would remain open in the event that the barrel was empty of bobbin, for example.) Also, if a bobbin 15 is not present to close the bobbin present switch 131, a second contact 230 of the relay 228 remains closed to energize the solenoid valve 178 of the bucket reopening cylinder 176 so that this cylinder raises its plunger 175 to reopen the gate 166 of the still empty bucket. As mentioned previously, when the reopening plunger 175 (FIG. 12) is extended to reopen the empty bucket, the plunger opens the switch 181 so that the solenoid valves 140 and 149 of the accelerator cylinder 138 and the holder cylinder 150, respectively, are not energized. A third normally closed relay contact 231 remains closed if a bobbin 15 is not on the bobbin present switch 131, and this contact is in circuit with the electric clutch 110 to keep the clutch energized and the drum sidewall 91 rotating to move a bobbin 15 onto the bobbin present switch and deenergize the clutch to stop the sidewall. As soon as the delivery switch 169 is depressed by the cam 170 of an open bucket 160, an instant operating terminal delay of time delay relay 232 is energized to open its contact 233 in circuit with the actuating coil of this time delay relay 232 so that the terminal delay timing is not effected by fast or slow operation of the delivery switch 169. A second, normally open contact 234 of the time delay relay 232 is in circuit with the electric drum clutch 110 (FIG. 8) and upon closing of this contact 234 the drum sidewall 91 starts rotating to move the bobbin 15 depressing the bobbin present switch 131 off of this switch and onto the gauge device 132 for delivery to the accelerator platform 137. The terminal delay of the time delay relay 232 is sufficiently long so that it expires after the bobbin 15 moves off of the bobbin present switch 131 and this switch opens. Therefore the sidewall 91 of the drum 86 continues to rotate until the bobbin present switch 131 again closes whereupon the contact 231 opens and the barrel stops rotating. Also shown in FIG. 24 is the barrel weight switch 106 (FIG. 2) which is in circuit with the motor 32 for the bin conveyor belt 38 and the delivery conveyor belt 67.

What is claimed is:

1. Bobbin handling apparatus for supplying filled bobbins to bobbin handling means having a variable demand for bobbins, comprising bobbin supply means automatically operable for moving the bobbins to said handling means, said bobbin supply means including storage means having bobbin receiving means for storing and moving said filled bobbins with the bobbins substantially stationary relative to each other and to said receiving means, said bobbin receiving means comprising a bin for receiving the filled bobbins in jumbled condition, said bin having a first end and an opposite discharge end, and a bin wall between said ends, said wall comprising a continuous belt having opposite ends, one adjacent each of the bin ends, said belt having upper and lower runs connected by return portions at said opposite ends and opposite continuous edge portions along said runs and said return portions, means mounting said belt along said edge portions for movement of said runs in opposite directions between the bin ends with said edge portions spaced from each other transversely of the belt and said belt depending from said edge portions and forming a deep sag in said upper run for holding said bobbins, and control means responsive to demand of said handling means for bobbins for moving said belt with said upper run moving from said first bin end toward said discharge end of said bin to discharge the bobbins from said bin for delivery to said handling means.

2. Apparatus as set forth in claim 1 in which said bobbin supply means includes delivery means comprising a continuous conveyor having bobbin receiving means operable for moving said filled bobbins with the bobbins substantially stationary relative to each other and to the last said receiving means, thereby effectively preventing scuffing of the yarn on the filled bobbins.

3. Apparatus as set forth in claim 2 in which said bobbins each have a large hollow end and a small end capable of telescoping into the large end of another bobbin, and in which said bobbin supply means is operable for separating bobbins which are telescoped and effectively preventing the bobbins from telescoping, said continuous conveyor comprises a conveyor belt having a receiving portion position below said discharge end of said bin, and said drive means being operable for moving said conveyor belt at a higher speed than the bin belt and separating telescoped bobbins as they pass from said bin belt to said conveyor belt by moving a first of said telescoped bobbins to engage said conveyor belt faster than a second of said bobbins and away from the second bobbin to separate the telescoped bobbins from each other.

4. Apparatus for handling filled yarn bobbins, comprising a bin having a first end and an opposite discharge end and a bin wall between said ends, said wall comprising a continuous conveyor belt having opposite ends, one adjacent each of the bin ends, and said belt having upper and lower runs connected by return portions at said opposite ends and opposite continuous edge portions along said runs and said return portions, said edge portions being spaced from each other and said belt depending from said edge portions to form a deep sag for holding said bobbins, means mounting said belt along said edge portions for movement of said runs in opposite directions between said bin ends with said upper run moving from said first bin end toward said discharge end of said bin to discharge the bobbins from said bin, means to drive said belt comprising a pair of driving means adjacent said discharge end of said bin with one of said driving means at each of said opposite edge portions of said conveyor belt, and means connecting said driving means, one to each adjacent one of said edge portions for driving said belt.

5. Apparatus as set forth in claim 4 in which said drive means comprises a drive shaft below said conveyor belt, said drive shaft having opposite ends, a pair of second driving means, one drivingly connecting each of the shaft ends with an adjacent one of the first said driving means for driving said belt.

6. Apparatus for handling filled yarn bobbins having a large hollow end and a small end capable of telescoping into the large end of another bobbin, comprising storage means including a bin having a first end and an opposite discharge end and a bin wall between said ends, said wall comprising a continuous first conveyor belt having opposite ends, one adjacent each of the bin ends, and said belt having upper and lower runs connected by return portions at said opposite ends and opposite continuous edge portions along said runs and said return portions, said edge portions being spaced from each other and said belt depending from said edge portions to a depth comparable to the distance between said edge portions and forming a deep sag for holding said bobbins, means mounting said belt along said edge portions for movement of said runs in opposite directions between said bin ends with said upper run moving from said first bin end toward said discharge end of said bin to discharge the bobbins from said bin, conveyor means including a continuous second conveyor belt having an upper run in the form of an upwardly opening generally V-shaped trough extending longitudinally of said run and inclined upwardly from a bobbin receiving end below the discharge end of said bin for receiving bobbins from the bin, whereby the bobbins may roll toward the bottom of said trough and into longitudinal alignment along said second conveyor belt, said second belt having surface means for receiving said bobbins and effectively preventing said bobbins from sliding thereon, and drive means operable for driving said first belt and said second belt at a higher speed than said first belt and increasing the spacing between bobbins as the bobbins pass successively from said first belt to said second belt and separating telescoped bobbins as they pass from said first belt to said second belt.

7. Apparatus as set forth in claim 6 in which said drive means comprises, a pair of first sprocket means adjacent said discharge end of said bin and one at each of said opposite edge portions of said first conveyor belt, means connecting said first sprocket means and adjacent ones of said edge portions for driving said first belt, a drive shaft below said first conveyor belt, said drive shaft having opposite ends, second sprocket means mounted on said drive shaft for rotation therewith, third sprocket means, one on each of the shaft ends, and drive chains, one drivingly connecting each of said first and third sprockets, means including a second drive shaft at said receiving end of said second conveyor belt for driving said second conveyor belt, fourth sprocket means mounted on said second drive shaft for rotation therewith, another drive chain drivingly connecting said second and fourth sprocket means, and means for driving either of said shafts, whereby said belts are driven in unison.

References Cited

UNITED STATES PATENTS

| | | | |
|---|---|---|---|
| 1,559,772 | 11/1925 | Peale | 198—191 X |
| 1,972,489 | 9/1934 | Rideout. | |
| 2,252,498 | 8/1941 | Flaws. | |

FOREIGN PATENTS

| | | |
|---|---|---|
| 738,809 | 7/1966 | Canada. |

EDWARD A. SROKA, Primary Examiner

U.S. Cl. X.R.

198—191, 203